United States Patent
McCarten et al.

(10) Patent No.: US 8,863,116 B1
(45) Date of Patent: Oct. 14, 2014

(54) PRE-STORING BLOCKS FOR A STREAMED APPLICATION IN A LOCAL CACHE ON A HOST COMPUTER SYSTEM

(75) Inventors: Ryan M. McCarten, Redwood City, CA (US); Taiwei Yin, Fremont, CA (US); Yury Mazin, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 1604 days.

(21) Appl. No.: 12/274,958

(22) Filed: Nov. 20, 2008

(51) Int. Cl.
*G06F 9/445* (2006.01)
*G06F 15/16* (2006.01)

(52) U.S. Cl.
USPC ............ 717/178; 717/175; 709/203; 709/231

(58) Field of Classification Search
None
See application file for complete search history.

(56) References Cited

U.S. PATENT DOCUMENTS

| | | | |
|---|---|---|---|
| 6,311,221 B1 | 10/2001 | Raz | |
| 6,317,880 B1 * | 11/2001 | Chamberlain et al. | 717/174 |
| 6,574,618 B2 | 6/2003 | Eylon | |
| 6,711,619 B1 * | 3/2004 | Chandramohan et al. | 709/229 |
| 6,918,113 B2 * | 7/2005 | Patel et al. | 717/178 |
| 6,959,320 B2 | 10/2005 | Shah | |
| 7,051,315 B2 | 5/2006 | Artzi | |
| 7,197,570 B2 | 3/2007 | Eylon | |
| 7,200,632 B1 | 4/2007 | Greschler | |
| 7,577,751 B2 | 8/2009 | Vinson | |
| 7,735,057 B2 * | 6/2010 | Rachman et al. | 717/100 |
| 7,917,902 B2 * | 3/2011 | Stahl et al. | 717/174 |
| 8,018,609 B2 * | 9/2011 | Takashima | 358/1.14 |
| 8,095,678 B2 * | 1/2012 | Worrall | 709/231 |
| 8,359,591 B2 * | 1/2013 | de Vries et al. | 717/172 |
| 8,380,808 B2 * | 2/2013 | O'Brien | 709/217 |
| 2002/0157089 A1 * | 10/2002 | Patel et al. | 717/178 |
| 2006/0048136 A1 * | 3/2006 | Vries et al. | 717/174 |
| 2006/0123185 A1 * | 6/2006 | de Vries et al. | 711/100 |
| 2006/0168294 A1 * | 7/2006 | de Vries et al. | 709/231 |
| 2007/0159648 A1 * | 7/2007 | Takashima | 358/1.14 |
| 2009/0133013 A1 * | 5/2009 | Criddle et al. | 717/174 |

OTHER PUBLICATIONS

Bouras, Ch., et al., "Application on Demand System Over the Internet," Journal of Network and Computer Applications [online], vol. 28, Issue 3, 2000 [retrieved May 29, 2014], Retrieved from Internet: <URL: http://www.sciencedirect.com/science/article/pii/S1084804504000475>, pp. 209-232.*

* cited by examiner

Primary Examiner — Isaac T. Tecklu
Assistant Examiner — Todd Aguilera
(74) Attorney, Agent, or Firm — Meyertons Hood Kivlin Kowert & Goetzel, PC

(57) ABSTRACT

A streamed application includes a plurality of application blocks. A first subset of the plurality of application blocks is pre-stored in a cache on a host computer system prior to initiating execution of the streamed application. The streamed application may then be executed. One or more application blocks of the first subset of the plurality of application blocks may be retrieved from the cache during execution of the streamed application in response to one or more requests to access the one or more application blocks of the first subset. A second subset of the plurality of application blocks may be received from a server computer system during the execution of the streamed application and may be stored in the cache. The second subset may include one or more application blocks that were not stored in the cache when the streamed application was installed.

16 Claims, 8 Drawing Sheets

PRE-STORING BLOCKS FOR A STREAMED APPLICATION IN A LOCAL CACHE ON A HOST COMPUTER SYSTEM

BACKGROUND OF THE INVENTION

1. Field of the Invention

This invention relates to the field of computer software. More particularly, the invention relates to the field of streamed applications, e.g., an application which executes on a host computer system, where executable code blocks for the application are dynamically streamed to the host computer system from a server computer system during execution of the application.

2. Description of the Related Art

The Internet is a rapidly growing network of interconnected computers from which users and applications can access a wide variety of resources. Initial widespread use of the Internet was limited to the delivery of static information. A newly developing area of functionality is the delivery and execution of complex software applications via the Internet.

One technique for delivering a software application to a host computer is to first download the entire application to the host computer from a server computer via the Internet, and then install and execute the software application on the host computer. However, the download time can be prohibitively long for large applications, resulting in a long wait between the time when the download begins and the time when the software application begins local execution.

More recently, streaming technology has been used to stream the executable code for a software application from a server computer to a host computer in such a way that allows the application to begin execution on the host computer before all of the executable code for the application has been delivered to the local host computer. Such a software application is referred to as a "streamed application". For example, the server computer may first stream one or more startup blocks which include just enough executable code for the streamed application to be launched on the host computer. Upon receiving the startup blocks, the host computer may execute the startup blocks to launch the streamed application. Further blocks of executable code for the streamed application may then be dynamically streamed to the host computer from the server computer while the streamed application is executing.

SUMMARY

Various embodiments of a system and method for installing and executing a streamed application on a host computer system are described herein. The streamed application may include a plurality of application blocks. The application blocks may include the executable code for the streamed application, as well as possibly other data of the streamed application. According to some embodiments of the method, a first subset of the plurality of application blocks may be pre-stored on a first storage device of the host computer system prior to initiating execution of the streamed application on the host computer system. For example, in some embodiments the first subset of the plurality of application blocks may be stored in a cache on the first storage device during an installation of the streamed application on the host computer system.

The method may further comprise initiating execution of the streamed application on the host computer system after the first subset of the plurality of application blocks has been stored on the first storage device. During the execution of the streamed application, one or more requests to access one or more application blocks of the first subset of the plurality of application blocks may be received. The one or more application blocks may be retrieved from the first storage device in response to the one or more requests.

In some embodiments the method may further comprise receiving a second subset of the plurality of application blocks from a server computer system during the execution of the streamed application. In some embodiments the second subset of the plurality of application blocks may be stored on the first storage device after being received from the server computer system. For example, the second subset of the plurality of application blocks may be stored in the cache on the first storage device along with the first subset of the plurality of application blocks.

BRIEF DESCRIPTION OF THE DRAWINGS

A better understanding of the invention can be obtained when the following detailed description is considered in conjunction with the following drawings, in which.

Figure 1:
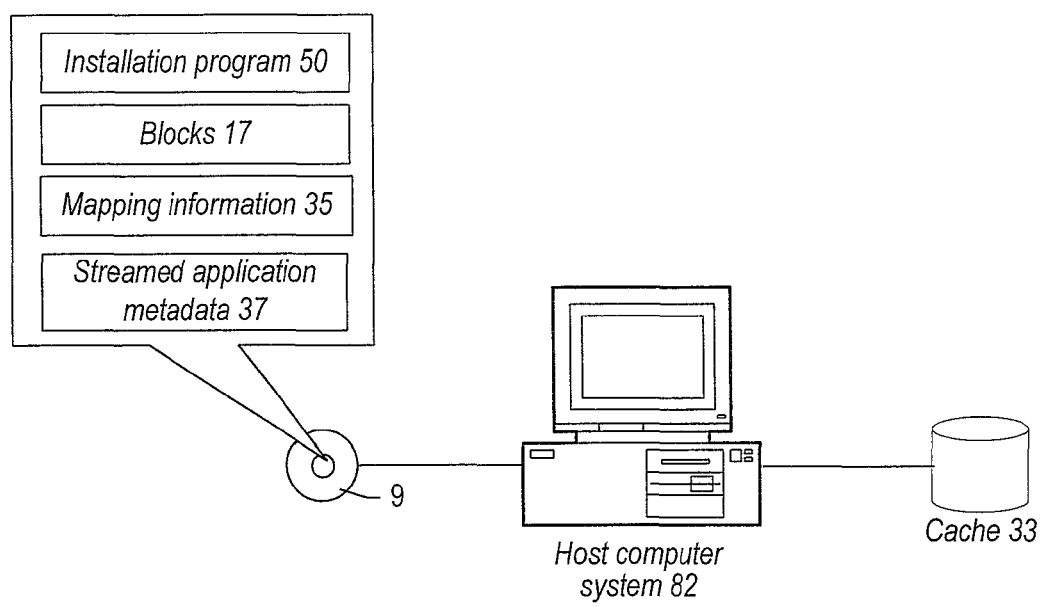
FIG. 1 illustrates a system in which a subset of a plurality of application blocks for a streamed application are stored in a local cache on a host computer system prior to executing the streamed application on the host computer system.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for installing and executing a streamed application on a host computer system are described herein. The streamed application may include a plurality of application blocks. The application blocks may include the executable code for the streamed application, as well as possibly other data of the streamed application. According to some embodiments of the method, a subset of the plurality of application blocks may be pre-stored on a storage device of the host computer system prior to initiating execution of the streamed application on the host computer system. For example, in some embodiments the first subset of the plurality of application blocks may be stored in a cache on the first storage device during an installation of the streamed application on the host computer system.

When the application is subsequently executed, executable code blocks or other application blocks that were pre-cached may be retrieved from the local cache as they are needed, thus avoiding the need to download these blocks from a remote server computer system. When other application blocks (e.g., other executable code blocks or data blocks) that were not pre-cached are needed, streamed application management software on the host computer system may dynamically request and receive these blocks from the remote server computer system.

In some embodiments each of the application blocks may be equally sized. In various embodiments the block size may be any size. In some embodiments the block size may be the same size as a page size used by the operating system when reading file data from a disk drive of the host computer system in response to page faults. For example, some Windows™ operating systems use a page size of 4 kb. Thus, if the streamed application executes on a Windows™ host computer system then the application blocks of the streamed application may have a size of 4 kb each.

FIG. 1 illustrates one embodiment of the system. The system includes a host computer system 82 on which the streamed application is to be executed. The system may also include an installation medium 9. The installation medium 9 stores information for installing the streamed application on the host computer system 82, such as an installation program 50, application blocks 17 (the subset of application blocks to be pre-cached), mapping information 35, and metadata 37 for the streamed application.

The application blocks 17 may be stored on the installation medium 9 in one or more files or databases. The mapping information 35 may map each of the blocks 17 to a file of the streamed application and a location within the file, as described in detail below. The metadata 37 includes information about the streamed application which is used by the installation program 50 to install the streamed application on the host computer system 82. For example, the metadata 37 may include information indicating which files are included in the streamed application, the sizes of the files and their file system layout, registry entries for the streamed application, installation scripts, etc.

Figure 2:
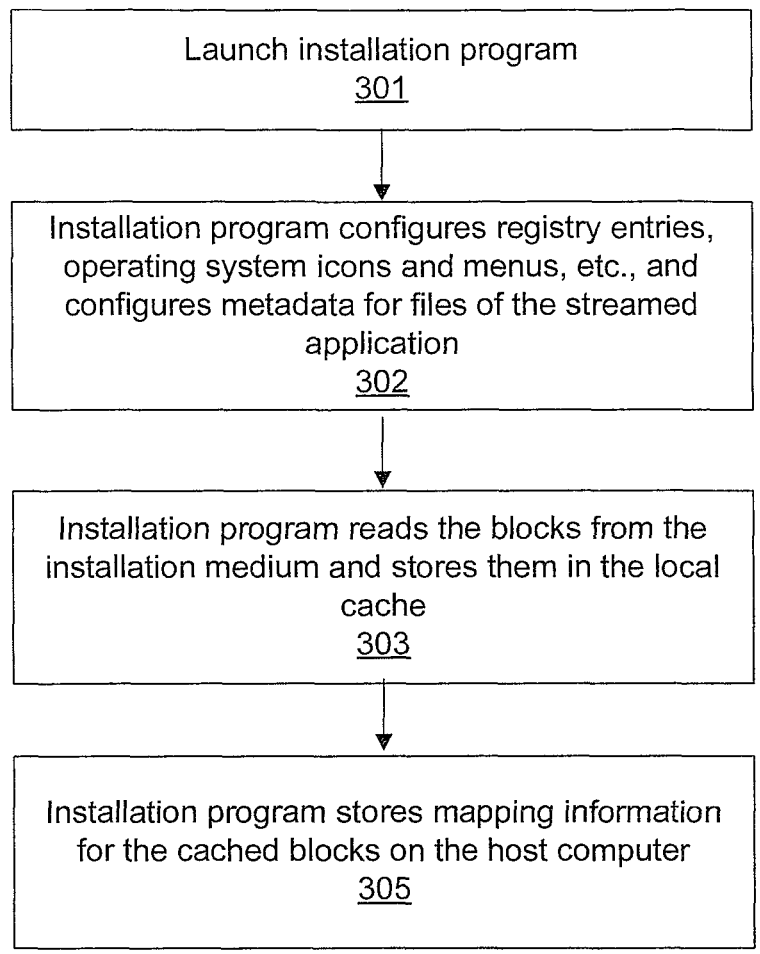
FIG. 2 is a flowchart diagram illustrating one embodiment of a method for installing the streamed application on the host computer system.

FIG. 2 is a flowchart diagram illustrating one embodiment of a method for installing the streamed application on the host computer system 82. In this embodiment, the installation program 50 may first be launched, as indicated in 301. For example, in some embodiments the installation medium 9 may be a CD-ROM, and the user may launch the installation program 50 by inserting the CD-ROM in a CD-ROM drive of the host computer system 82. Inserting the CD-ROM may cause the installation program 50 to launch automatically, or the user may browse to the installation program 50 in a file browser and request the installation program 50 to be launched. In other embodiments the installation program 50 may be stored in a location other than the installation medium 9, such as on a disk drive of the computer system 82.

In other embodiments the installation medium 9 may be in any of various forms other than a CD-ROM. For example, the installation medium 9 may be another type of optical disc or medium, such as a DVD for example. As another example, the installation medium 9 may be a flash memory device, e.g., where the flash memory device may be connected to the host computer system 82 through a USB port or other port of the host computer system 82. As another example, in some embodiments the installation medium 9 may be a hard disk or other storage medium of the host computer system 82. For example, in some embodiments the information illustrated in FIG. 1 which is stored on the installation medium 9 may be copied to the hard disk of the host computer system 82 from a server computer system. In yet other embodiments the installation medium 9 may be a medium of a network storage device with which the host computer system 82 communicates via a network. In general, the installation medium 9 may be any kind of storage medium and may be coupled to the host computer system 82 in any of various ways.

The installation program 50 may execute to install the streamed application on the host computer system 82, e.g., by configuring the host computer system 82 so that it is able to execute the streamed application. In various embodiments the installation program 50 may configure the host computer system 82 in any of various ways during the installation, e.g., depending on the operating system used by the host computer system 82. For example, as indicated in 302, in some embodiments installing the streamed application may include configuring registry entries, configuring operating system icons and menus for launching the streamed application in response to user input, etc., as indicated in 302. The metadata 37 stored on the installation medium 9 may include information enabling the installation program 50 to perform these operations.

As noted above, the metadata 37 stored on the installation medium 9 may also include information indicating which files are included in the streamed application, and the sizes of the files and their appropriate file system layout. In 302 the installation program may use this information to configure file system metadata for the files of the streamed application. For example, the installation program may create file system metadata structures for the files of the streamed application so that it appears to the operating system that the files are fully present on the host computer system 82 and layed out as indicated by the metadata 37. However, the files may be empty, e.g., such that the actual data for the files is not stored within the files. As described below, streamed application management software may execute to intercept and handle requests to access the files of the streamed application when the streamed application is subsequently executed.

As indicated in 303, the installation program may also read the blocks 17 from the installation medium 9 and store them in the cache 33. The cache 33 is a storage area on a storage device which is accessible to the host computer system 82. For example, in some embodiments the cache 33 may be stored on a disk drive of the host computer system 82. In other embodiments the cache 33 may be stored on any of various other types of storage devices included in or accessible by the host computer system 82. The storage device on which the cache 33 is stored is preferably either a local storage device (e.g., coupled to the host computer system 82 via a communication bus or port), or otherwise coupled to the host computer system 82 through a fast network so that the host computer system 82 can quickly and reliably access data on the storage device, e.g., without a long network latency.

As indicated in 305, the installation program may also store mapping information on the host computer system 82, where the mapping information maps each of the blocks 17 to a file of the streamed application and a location within the file. In some embodiments the mapping information may be copied from the installation medium 9 to the disk drive or other storage device of the host computer system 82.

As described below, streamed application management software is used during the execution of the streamed application, and in some embodiments may also be used during the installation of the streamed application. In some embodiments, installing the streamed application may also include installing the streamed application management software on the host computer system 82 if the streamed application management software is not already installed.

Figure 3:
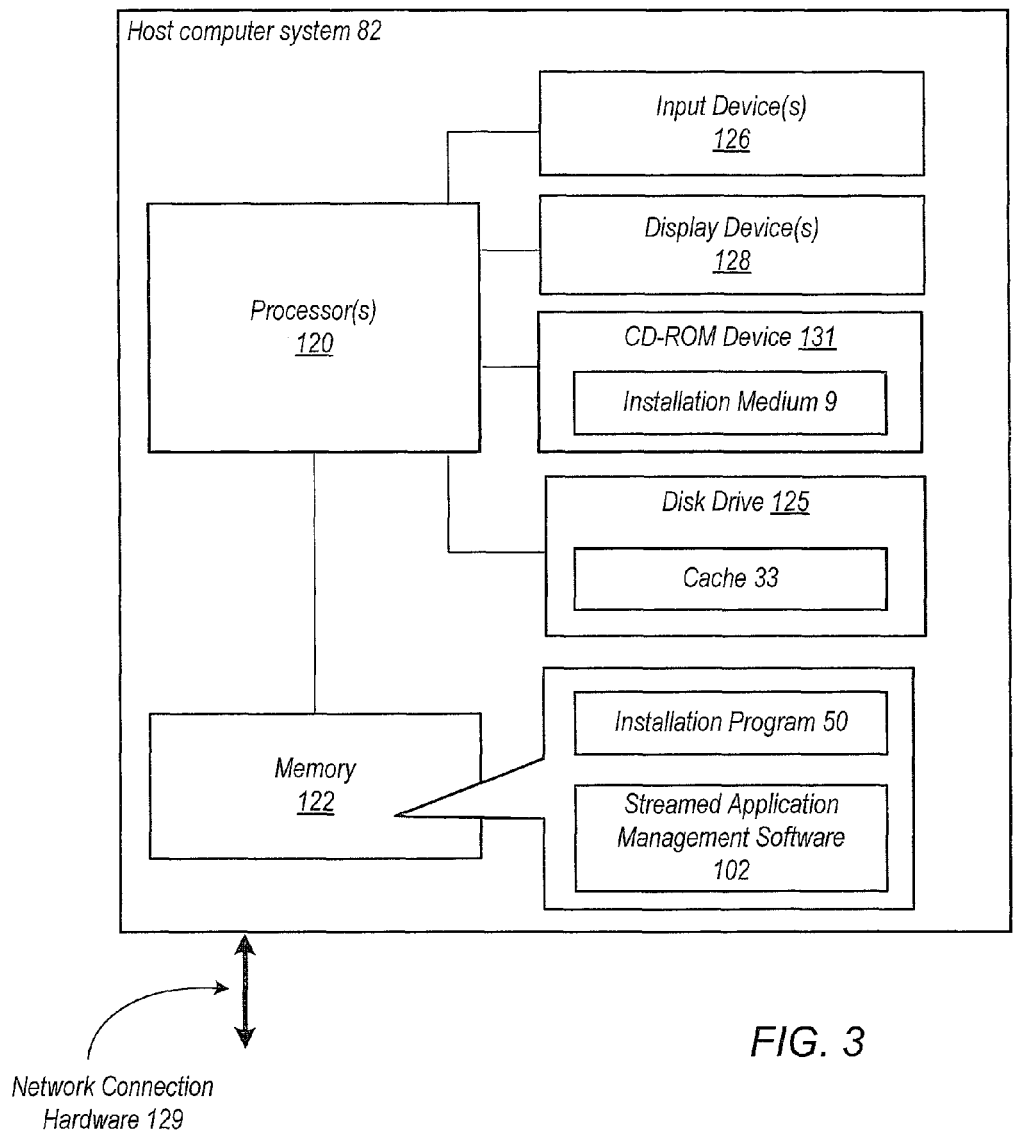
FIG. 3 illustrates an example of the host computer system in more detail.

FIG. 3 illustrates an example of the host computer system 82 in more detail according to one embodiment. It is noted that FIG. 3 is provided as an example, and in other embodiments the host computer system 82 may be implemented in various other ways. In some embodiments the host computer system 82 may comprise a computer such as a personal computer system (PC), workstation, portable computer (e.g., laptop or notebook), personal digital assistant (PDA), television system, or other computing device or combination of devices.

In the illustrated example, the host computer system 82 includes one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or other data. In particular, the memory 122 may store the installation program 50, e.g., where the installation program 50 is read into the memory 122 from the installation medium 9 or from another location. The installation program 50 may be executed by the processor(s) 120 to install the streamed application, as described above. In some embodiments the memory 122 may also store streamed application management software 102. In some embodiments the streamed application management software 102 may execute in conjunction with the installation program 50 to install the streamed application, e.g., as described below. The streamed application management software 102 may also execute during the execution of the streamed application to handle requests to access the files of the streamed application, as discussed below. The memory 122 may also store various other software which executes in conjunction with the installation program 50 when installing the streamed application, such as operating system software, file system software, network communication software, etc.

Referring again to FIG. 3, it is noted that the processor 120 is representative of any type of processor. For example, in some embodiments the processor 120 may be compatible with the x86 architecture, while in other embodiments the processor 120 may be compatible with the SPARC™ family of processors. Also, in some embodiments the host computer system 82 may include multiple processors 120.

In the illustrated embodiment, the cache 33 is stored on a disk drive 125 of the host computer system 82. The disk drive 125 may be implemented as one or more hard disks configured independently or as part of a disk storage system. For example, in some embodiments the disk storage system may be a redundant array of inexpensive disks (RAID) system. In other embodiments, the disk storage system may be a disk array, or Just a Bunch Of Disks (JBOD), (used to refer to disks that are not configured according to RAID). The disk drive 125 may be included in or coupled to the host computer system 82 in any of various ways, such as direct attached storage, fibre channel storage, storage area network (SAN) storage, iSCSI storage, etc. In other embodiments the cache 33 may be stored on any of various types of storage devices other than a disk drive, such as a tape drive, optical storage device, flash memory device, or RAM disk, for example.

In the illustrated embodiment, the installation medium 9 is a CD-ROM accessible through a CD-ROM device 131. However, as noted above, in other embodiments the installation medium 9 may take on various other forms.

The host computer system 82 may also include one or more input devices 126 for receiving user input. The input device(s) 126 may include any of various types of input devices, such as keyboards, keypads, microphones, or pointing devices (e.g., a mouse or trackball).

The host computer system 82 may also include one or more output devices 128 for displaying output. The output device(s) 128 may include any of various types of output devices or display devices, such as LCD screens or monitors, CRT monitors, etc.

The host computer system 82 may also include network connection hardware 129. The host computer system 82 may couple through a network to a streaming server computer system using the network connection hardware 129. The network may include any type or combination of local area network (LAN), a wide area network (WAN), wireless networks, an Intranet, the Internet, etc. Examples of local area networks include Ethernet networks, Fibre Channel networks, Fiber Distributed Data Interface (FDDI) networks, and token ring networks. Also, the host computer system 82 may be coupled to the network using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

Figure 4:
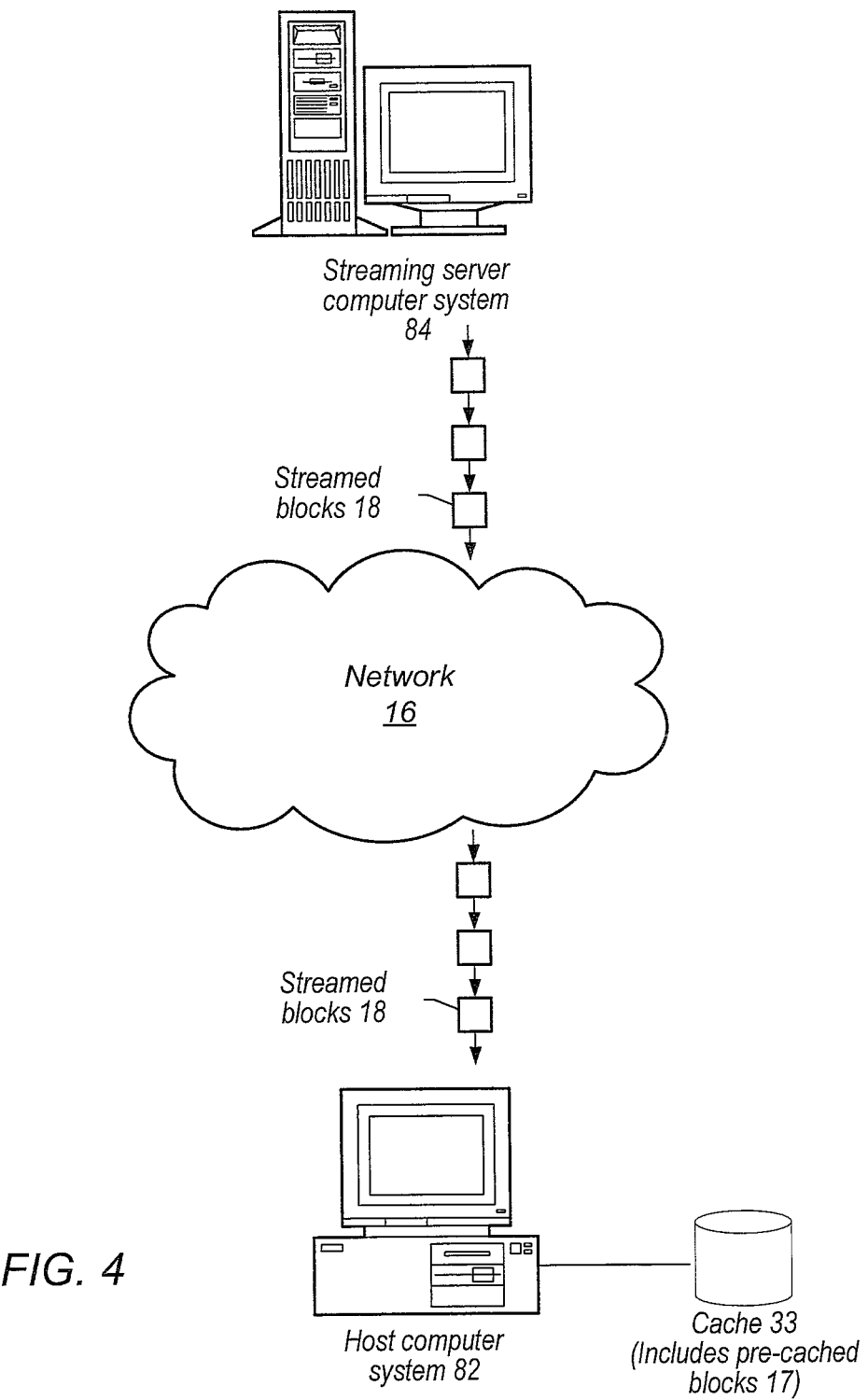
FIG. 4 is a diagram illustrating execution of the streamed application after it has been installed on the host computer system.

FIG. 4 is a diagram illustrating execution of the streamed application after it has been installed on the host computer system 82. As discussed above, the installation program 50 may create metadata for the files of the streamed application so that it appears to the operating system that the files are fully present on the host computer system 82, but the actual file data may not be present. When the streamed application is executed the operating system may attempt to read the executable code for the streamed application from the application files. The streamed application management software is configured to intercept the requests to read pages from the application files of the streamed application. As noted above, the application blocks for the streamed application may have the same size as the page size used by the operating system. Thus, each block may correspond to a page in one of the application files.

When the streamed application management software intercepts a request to read a particular application file page, the streamed application management software may check to determine whether the block corresponding to the application file page is already present in the cache 33 on the host computer system 82. The streamed application management software may use the mapping information to determine whether the block is present in the cache 33. If the block is present then the streamed application management software may retrieve the corresponding block from the cache 33 and return the block to the operating system, thus satisfying the read request. The block may then be executed or otherwise used by the streamed application.

Otherwise, if the corresponding block is not present in the cache 33 then the streamed application management software may communicate through the network 16 to retrieve the block from the streaming server computer system 84. Once the block has been received from the streaming server computer system 84, the block may be returned to the operating system to satisfy the read request. The streamed application management software may also add the block to the cache 33 so that the block can be retrieved from the cache locally in response to future requests for the corresponding application file page without having to retrieve the block from the remote streaming server computer system 84 again. The streamed application management software may also update the mapping information on the host computer system 82 to indicate that the block is now stored in the cache 33 and to indicate a block identifier or other information useable to retrieve the block from the cache 33.

Thus, the blocks 17 that were pre-stored in the cache 33 during the installation of the streamed application may be retrieved locally from the cache 33 when the application file pages corresponding to these blocks are needed by the operating system during the execution of the streamed application. As illustrated in FIG. 4, other blocks 18 that were not pre-stored in the cache 33 during the installation of the streamed application may be dynamically retrieved from the streaming server computer system 84 when the application file pages corresponding to these blocks are needed during the execution of the streamed application.

For some applications it is likely that large portions of code and data may never need to be accessed. Thus, some of the application blocks for the streamed application may not be pre-cached during the installation. This may enable the streamed application to be installed in significantly less time than if all of the code and data for the streamed application were completely installed on the host computer system during the installation. If any of the blocks that were not pre-cached are ever needed, these blocks can be dynamically retrieved from the streaming server computer system 84 during execution of the streamed application.

In some embodiment the blocks 17 that are pre-cached on the host computer system 82 during the installation may include one or more startup blocks necessary to begin executing the streamed application. Thus, the host computer system 82 may be able to immediately begin executing the streamed application without waiting for the startup blocks to be streamed from the server computer system 84. In some embodiments the pre-cached blocks 17 may also include executable code blocks that implement commonly used functionality or features of the streamed application. Thus, in some embodiments the execution efficiency of the streamed application may be increased by pre-caching executable code blocks that are likely to be needed during the execution of the streamed application so that these blocks do not need to be streamed to the host computer system 82 from the streaming server computer system 84.

Pre-caching the startup blocks, commonly used blocks, or other blocks of the streamed application during the installation of the streamed application may thus increase the execution efficiency of the streamed application in some embodiments. This may be particularly useful for host computer systems with slow or intermittent network connections.

In other embodiments all of the blocks of the streamed application may be pre-cached on the host computer system 82 during the installation so that none of the blocks need to be retrieved from the streaming server computer system 84. Although all of the blocks may be pre-cached during the installation, the streamed application may still be managed by the streamed application management software. For example, the streamed application management software may provide various management features, such as licensing features. For example, although the application code may not need to be downloaded from the streaming server computer system 84, the streamed application management software may still contact the streaming server computer system 84, e.g., to verify that the user of the host computer system 82 has a valid license to use the streamed application, or to verify that a time limit for the use of the streamed application has not expired.

Figure 5:
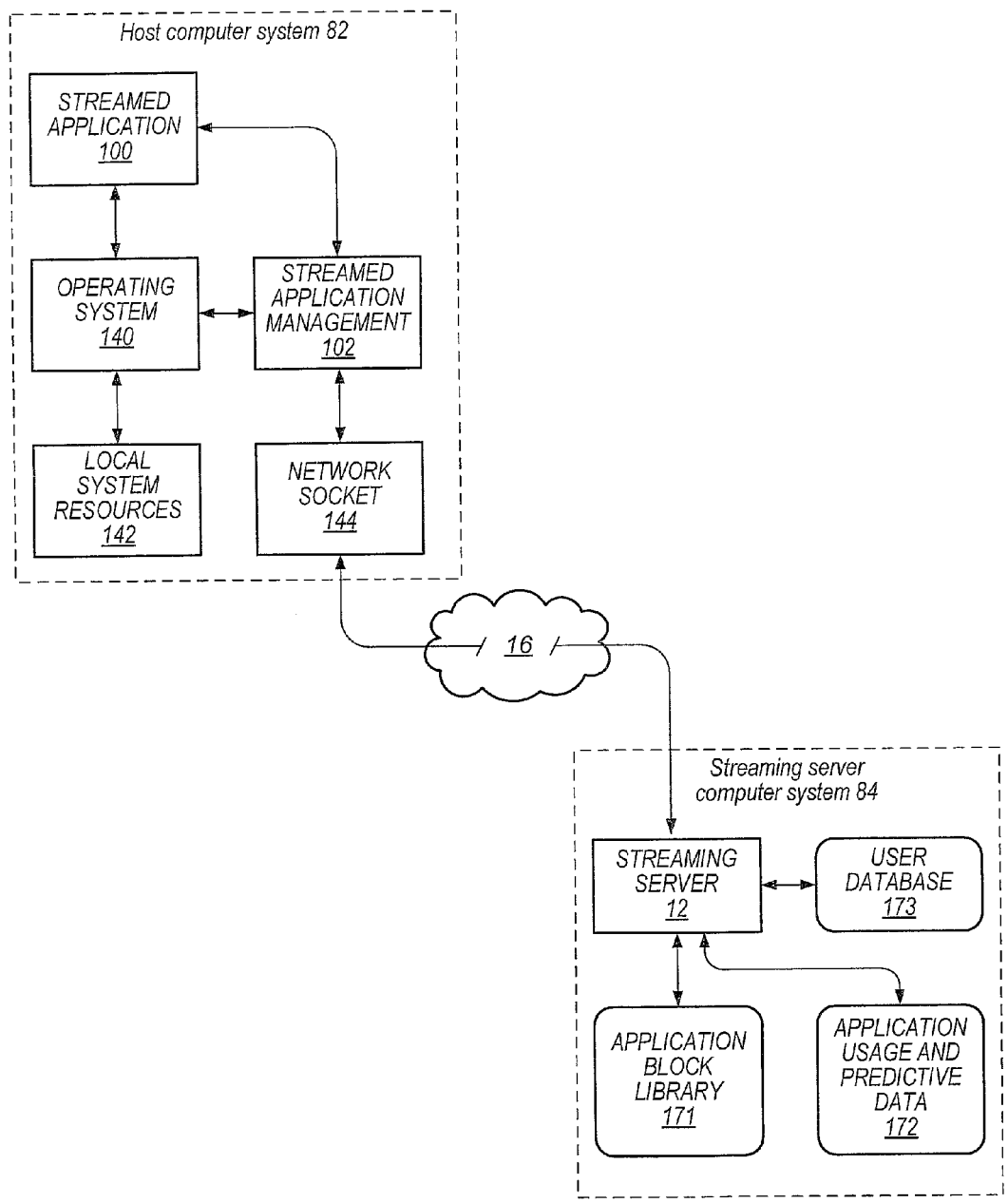
FIG. 5 is a block diagram showing a high-level architecture of the host computer system and a streaming server computer system.

FIG. 5 is a block diagram showing a high-level architecture of the host computer system 82 and the streaming server computer system 84 according to one embodiment. As shown, the streaming server computer system 84 may include streaming server software 12 that accesses one or more databases which store information used to manage the application streaming. In some embodiments, the streaming server software 12 may access an application library 171 which contains blocks for the streamed application. In some embodiments the streaming server software 12 may also access a predictive data model 172 which contains information about the usage patterns of the streamed application, e.g., the probability that the application will require a given block depending on the previous blocks that were accessed. A user database 173 may also be provided for storing various user-specific information for use in authorizing access to the streamed application, storing information related to streaming order, etc.

The host computer system 82 may include an operating system 140 which can access a variety of local system resources 142, such as data storage devices and memory. Streamed application management software 102 is also provided. The streamed application management software 102 may be configured to initiate the execution of the streamed application 100, request specific blocks from the streaming server 84 when necessary, process received blocks, and make blocks available for use by the streamed application in a manner which is generally transparent to the native operating system 140.

Figure 6:
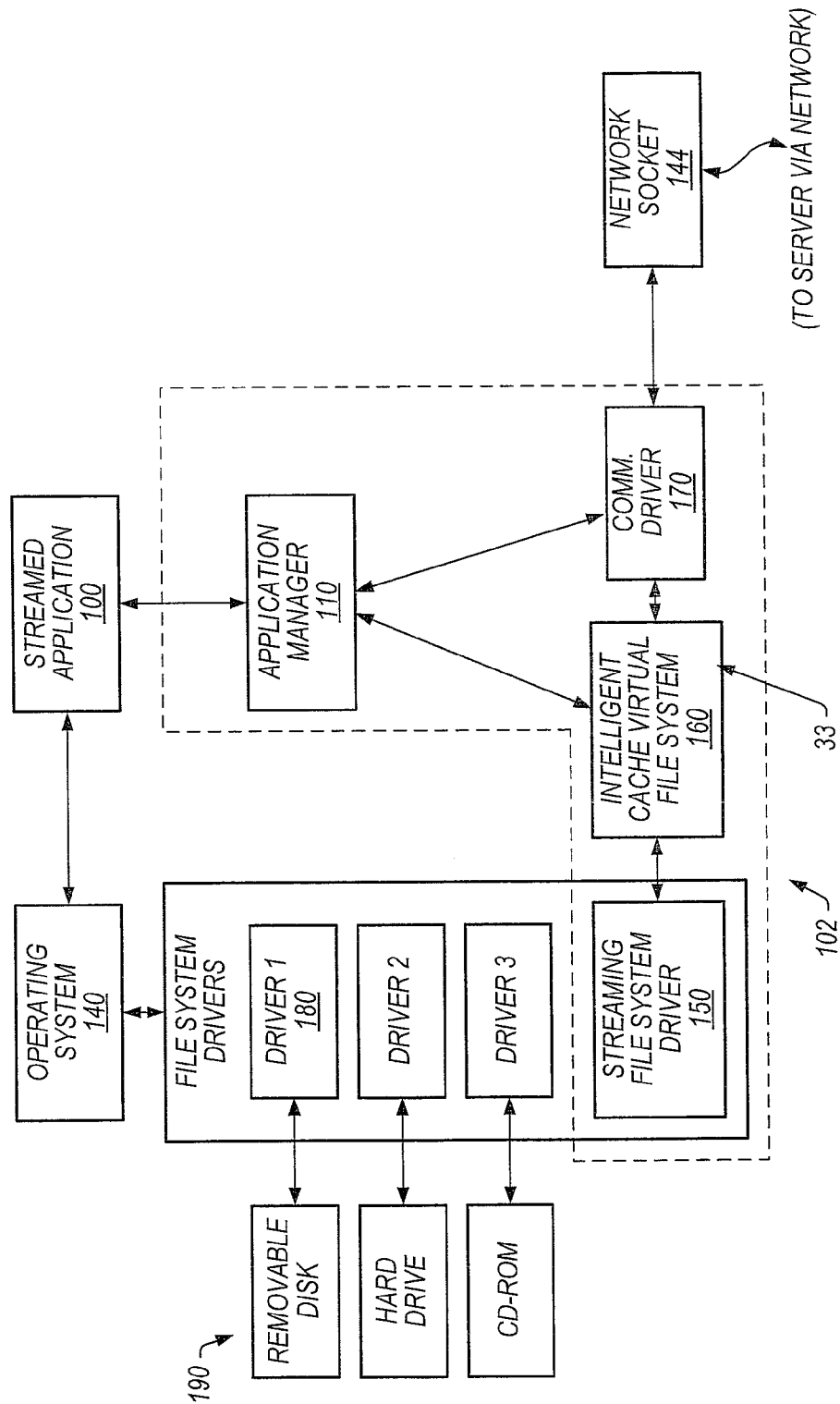
FIG. 6 is a block diagram of the host computer system showing various modules of streamed application management software which manages the streamed application on the host computer system.

FIG. 6 is a more detailed block diagram of the host computer system 82 showing various modules of the streamed application management software 102 according to one embodiment. The operating system 140 may access various storage devices 190 of the host computer system 82, such as a removable disk, a hard drive, and a CD-ROM drive. Each storage device 190 typically has an associated device driver 180 which acts as an interface between the standard I/O protocols used by the operating system 140 and the specific I/O protocols used by the given device 190.

In some embodiments, the cache 33 may be implemented in a virtual file system (VFS) 160, such as illustrated in FIG. 6. The VFS 160 is provided to store and organize received application blocks and present an appearance to the operating system 140 that all of the application files are locally present. The VFS 160 may reside on a local storage device, such as a hard drive of the host computer system 82. Some or all of the VFS 160 can alternatively be retained in system memory. A streaming file system device driver ("FSD") 150 is provided to act as an interface between the operating system 140 and the VFS 160. The VFS 160, through the FSD driver 150, is configured to appear to the operating system as a local virtual file system which can be accessed by the operating system in the same manner as other data storage devices 190. When the streamed application is launched, it is configured to indicate the VFS 160 as the source for application files. Thus, from the operating system point of view, the application appears to be present on a local drive. However, unlike a conventional local file system 190, such as a hard disk or CD-ROM accessed through a conventional device driver 180, the VFS 160 does not need to (and generally will not) contain complete copies of the various application files of the streamed application. Instead, only those blocks of the various application files that were pre-cached during the installation or that were previously received from the streaming server 84 during previous executions of the streamed application are present. The blocks representing the executable code or data for some files may be missing altogether, and the blocks for other files may be only partially present.

In addition to the VFS 160 and FSD driver 150, the streamed application management software 102 may also include an application manager 110 and a communication driver 170. In some embodiments the application manager may register the streamed application with the VFS 160 and/or FSD 150 to limit access to the blocks of the streamed application as a way of preventing a user from extracting application data from the VFS 160 without authorization. The application manager 110 may be further configured to monitor and meter the usage of the streamed application, to indicate the application status to the end user, and perform or initiate cleanup functions when the streamed application is terminated. The communication driver 170 is configured to process blocks streamed to the host computer system 82 from the streaming server 84 and to issue requests to the streaming server 84 for blocks needed by the VFS.

When the application manager 110 is started, it is provided with information that identifies the streamed application to execute and also indicates which block or blocks of the application are required for initial execution. This information can be passed to the application manager 110 as startup parameters or can be fetched from the streaming server 84. When first starting an application, the application manager 110 may check the VFS 160 to determine if the startup blocks for the application are already present, as may be the case if they were pre-cached during the installation or if the user previously executed the streaming application. If the required startup blocks are present, the application manager 110 instructs the operating system using standard operating system procedures to load and run the application from the VFS 160. If the required startup blocks are not present, a fetch request will be issued to the streaming server 84 to retrieve them. Once retrieved from the streaming server 84, the startup blocks may be stored in the VFS 160, and may be executed.

The VFS 160 appears to the operating system as a drive which contains the application files. While information about the folder structure and file structure of the streaming application is available, the actual data of the files may or may not be present in the VFS 160. When the application is started, the operating system may attempt to load the initial application executable file and possibly additional library files, such as DLLs. Many conventional operating systems, such as the various Windows™ operating systems from Microsoft Corporation, use memory mapped file mechanisms. This functionality allows a portion of a file to be loaded into memory and the remaining aspects of the file to be represented as missing code pages. As the loaded executable or DLL is processed, the operating system issues a series of page faults or similar input requests to dynamically load additional needed portions of the file into memory.

The specific mechanisms for dynamically loading sections of an application file or library vary in accordance with the operating system at issue and will be known to those skilled in the art. For example, in a Windows™ operating environment, the LoadLibrary API can be called from an application to have the operating system load a DLL. In response, the header of the DLL is read and loaded into memory. The remainder of the DLL itself is loaded using a memory mapped file mechanism which represents the additional portions of the DLL as a series of absent pages or code blocks for the various functions defined in the DLL. The additional parts will be loaded dynamically through fault conditions as functions are called from the DLL. In particular, using the DLL header information, when the operating system detects that an unloaded function of a DLL is required, a data read operation is issued to load the needed portion of the DLL. Typically, a DLL contains many functions, only one or a few of which are needed immediately after the DLL is loaded and thus the majority of the DLL may remain absent from memory for some time after the initial DLL load.

When a page fault exception occurs in the streamed application context, the operating system issues a paging request signaling that a specific page of code is needed for the streamed application. A typical request will specify the drive, file name (or handle), offset, and length of the application block(s) to retrieve. Because the operating system 140 views the application as residing on the virtual file system "drive" 160, it will automatically direct the paging request to the dedicated streaming FSD driver 150. When the FSD 150 receives a paging request, it passes the request to the VFS 160 which determines if the desired block is available locally. If the block corresponding to the requested page is present, it is retrieved and returned to the operating system. For example, if the block was pre-cached during the installation or previously received during a previous execution of the streamed application than the block may be present locally in the cache/VFS 160.

If the desired block is not available locally, a fetch request for the needed block is sent through the communication driver 170 to the streaming server 84. The VFS 160 waits until the request to the server has been fulfilled. After the requested block has been received from the server and stored in the VFS, the block is returned to the operating system. A busy or wait flag can be presented to the operating system during the time the fetch request is outstanding.

The format and content of the fetch request issued by the VFS 160 and/or application manager 110 can vary. In one embodiment, the request specifically identifies the blocks which are required. Alternatively, details regarding the faulting read request issued by the operating system, such as the file name, offset, and length, can be forwarded to the server which then determines the appropriate blocks to be returned and may also return additional data not yet requested if it determines that the additional data may be required shortly.

Figure 7:
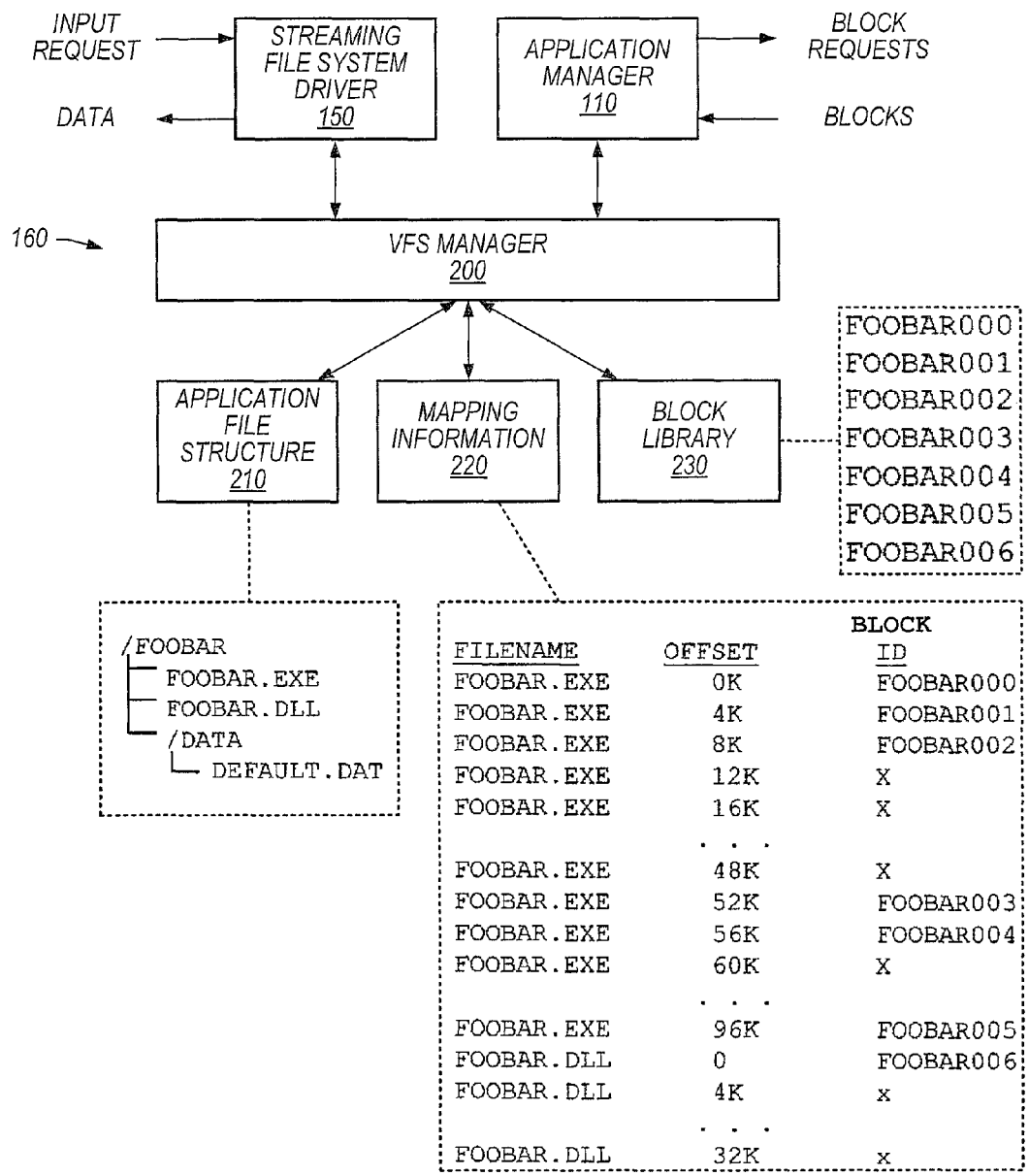
FIG. 7 illustrates one embodiment of a virtual file system which implements a cache in which application blocks of the streamed application are stored locally on the host computer system.

FIG. 7 illustrates one embodiment of the VFS 160 which is configured to appear to the host computer system 82 as a drive which can be accessed through the FSD driver 150. The VFS 160 includes a VFS Manager module 200 which provides a functional interface to a plurality of data files for the streamed application. In particular, the VFS 160 includes an application file structure database 210 which indicates the complete folder/file structure for the streamed application. In addition a block library 230 is provided within which blocks (e.g., blocks that are pre-cached during the installation and/or blocks that are received from the streaming server 84 during execution) are stored. Mapping information 220 can be used to associate each block in the library 230 with a respective file name and position within that file.

The various libraries, maps, and databases used by the VFS 160 can be stored in RAM, in appropriate data files on a conventional local device, such as a hard drive, or distributed between various short and long-term storage devices. In one embodiment, the application file structure and block map information is retained in RAM, and the blocks in the block library are stored on a local hard disk.

FIG. 7 shows representative data for a simple example streamed application FOOBAR which includes a 100 kb executable, FOOBAR.EXE and a 40 kb library file, FOOBAR.DLL, both of which are stored under the application folder FOOBAR. A data file, DEFAULT.DATA, is also provided under a DATA subfolder. Preferably, each block has a size which corresponds to the standard I/O page size used by the native operating system. A typical size is the 4 kb page size used in Windows™ operating systems. In this example, seven 4 kb blocks have been stored in the block library 230, six of which are associated with various sections of the executable file FOOBAR.EXE, and one of which is associated with the DLL file FOOBAR.DLL. The mapping information 220 indicates which parts of the various application files each block is associated with. For example, the block FOOBAR001 represents a code page in the FOOBAR.EXE file beginning at offset 4 k.

The mapping information 220 is shown in a basic table format for simplicity. Also shown in the sample mapping information 220 are absent blocks. For example, the block corresponding to the code page starting at an offset of 4 k in the DLL file is not defined in the map, here having an associated block ID of "x", and is therefore considered absent. As will be appreciated, absent blocks need not be defined expressly. The actual mapping and local block storage can be done in a variety ways using various database and linked object mechanisms and data structures which are known to those of skill in the art. In one implementation, the map is stored, at least in part, as a binary table with a bit corresponding to each block in each file. Thus, the sample 140 kb file set would contain 35 bit entries reflecting the presence or absence of the twenty five 4 kb blocks in the executable and the ten blocks in the DLL.

During execution, blocks representing additional code pages streamed to the host computer system 82 from the streaming server 84 are received by the application manager 110 where, after verification, they are passed to the VFS manager 200 which adds the blocks to the library 230 and updates the mapping information 220 accordingly. When a page fault occurs, the application issues a read request which is passed in an appropriate format to the VFS manager 200 by the FSD driver 150. The VFS manager accesses the map 220 to determine if the required blocks for the requested pages are present and, if so, returns the requested data.

According to a further embodiment, the VFS 160 is configured to prevent a user from running a streamed application locally without first accessing the streaming server 84 and requesting the streamed application be initiated. This feature can be useful, for example, to control use of the application as per license agreements or for billing purposes.

In one technique, one or more key blocks of code or data are specially flagged to prevent them from being persistently stored in the VFS 160 between sessions. When the streamed application exits, these tagged blocks are deleted. To execute the streamed application, the streaming server 84 must be accessed again to retrieve these key blocks. Alternatively, the blocks can be encrypted and the key(s) stored in the VFS 160 only for an authorized period of time.

In another technique, the VFS 160 or FSD driver 150 can contain a registry of running authorized streamed applications. Such a registry can be created by the application manager 110 when a new streamed application is started. To prevent a user from copying the stored blocks to a local drive, the streaming FSD 150 can be configured to only process read or page-in requests from the operating system which are generated on behalf of the application itself or on behalf of other approved processes.

Figure 8:
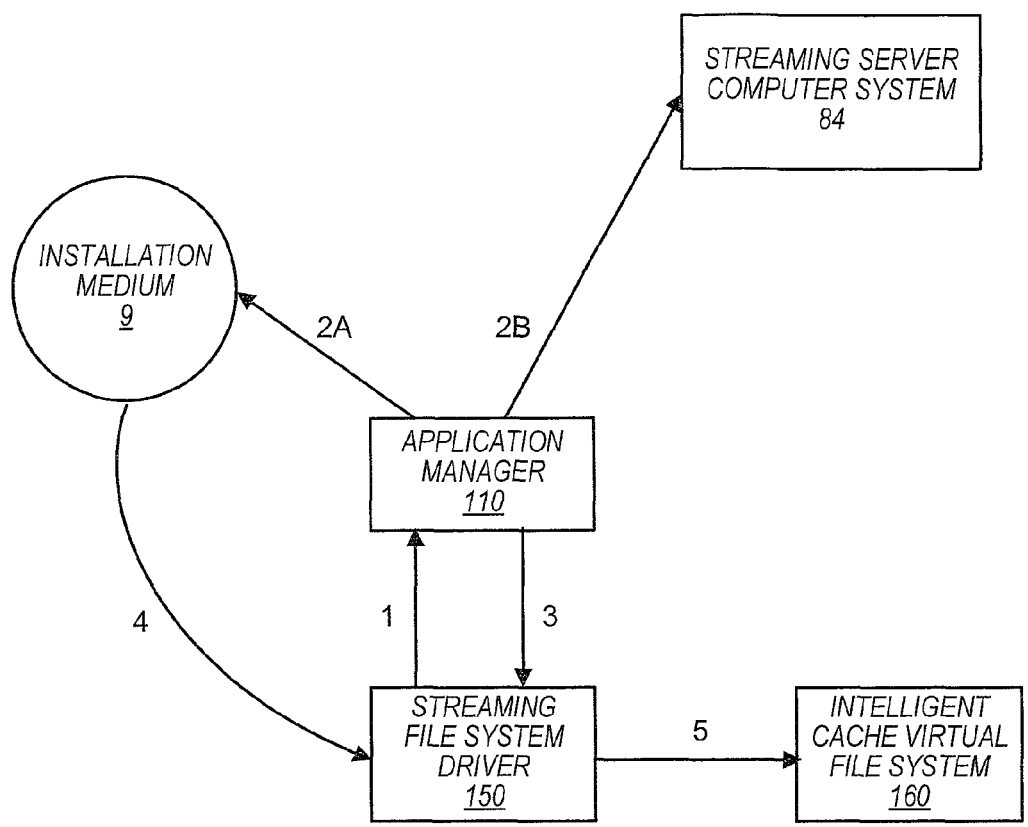
FIG. 8 is a flow diagram illustrating an alternative embodiment of a method for installing the streamed application on the host computer system.

FIG. 8 is a flow diagram illustrating an alternative embodiment of a method for installing the streamed application on the host computer system 82. In this example, the streamed application management software is used during the installation. The installation program may launch a setup program that needs to access one or more of the application files during the installation in order to obtain information about the streamed application. For example, an icon to be placed on the desktop GUI of the host computer system 82 may need to be extracted from one of the application files.

As indicated by the arrow 1, the streaming file system driver (FSD) 150 may intercept requests to read various pages of the application files during the installation and may notify the application manager 110 of the read requests. As indicated by the arrow 2A, the application manager 110 may check to determine whether the blocks corresponding to the requested pages are stored on the installation medium 9. If so, the blocks may be retrieved from the installation medium 9. Otherwise, as indicated by the arrow 2B, the application manager 110 may communicate with the streaming server computer system 84 to retrieve the needed blocks. The blocks retrieved from the installation medium 9 and/or the streaming server 84 are then passed back to the FSD 150, as indicated by the arrow 3. The FSD in turn passes the blocks back to the operating system, which in turn passes the blocks back to the setup program.

The installation medium 9 may include other blocks that were not requested by the setup program. Any blocks stored on the installation medium that were not requested by the setup program may be copied into the cache/VFS 160, as indicated by the arrows 4 and 5.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   executing an installation program on a host computer system, wherein the installation program executes to a) install, on the host computer system, management software for managing execution of a streamed application; and b) perform one or more read requests to request one or more information blocks of the streamed application to use in installing the streamed application on the host computer system; and
   execute the management software on the host computer system, wherein the management software executes to intercept the one or more read requests, and for each of the requested information blocks: a) determine whether the requested information block is included in a first subset of a plurality of information blocks of the streamed application, wherein the first subset of the plurality of information blocks is stored on an installation medium, wherein a second subset of the plurality of information blocks is stored on a server computer system; b) if the requested information block is included in the first subset of the plurality of information blocks, retrieve the requested information block from the installation medium; c) if the requested information block is not included in the first subset of the plurality of information blocks, retrieve the requested information block from the server computer system; and d) return the requested information block to the installation program;

wherein the installation program further executes to install the streamed application on the host computer system, wherein said installing the streamed application uses the information blocks returned by the management software, and wherein said installing the streamed application includes copying the first subset of the plurality of information blocks from the installation medium to a first storage device of the host computer system without transferring the first subset of the plurality of information blocks from the server computer system.

2. The method of claim 1, wherein the streamed application includes a plurality of files;

wherein the method further comprises the installation program storing mapping information on the first storage device, wherein the mapping information maps each block of the first subset of the plurality of information blocks to a location within one of the plurality of files.

3. A system comprising:

an installation medium which stores: a) a first subset of a plurality of information blocks of a streamed application, wherein a second subset of the plurality of information blocks of the streamed application is stored on a server computer system; b) an installation program for installing the streamed application; and c) management software for managing execution of the streamed application; and a host computer system including a first storage device and one or more processors, wherein the installation program is executable by the host computer system to: a) install the management software on the host computer system; and b) perform one or more read requests to request one or more information blocks of the streamed application to use in installing the streamed application on the host computer system;

wherein the management software is executable by the host computer system to intercept the one or more read requests, and for each of the requested information blocks: a) determine whether the requested information block is included in the first subset of the plurality of information blocks stored on the installation medium; b) if the requested information block is included in the first subset of the plurality of information blocks, retrieve the requested information block from the installation medium; c) if the requested information block is not included in the first subset of the plurality of information blocks, retrieve the requested information block from the server computer system; and d) return the requested information block to the installation program;

wherein the installation program is further executable by the host computer system to install the streamed application on the host computer system, wherein said installing the streamed application uses the information blocks returned by the management software, and wherein said installing the streamed application includes copying the first subset of the plurality of information blocks from the installation medium to the first storage device of the host computer system without transferring the first subset of the plurality of information blocks from the server computer system.

4. The system of claim 3, wherein the plurality of information blocks of the streamed application includes a plurality of executable code blocks;

wherein the host computer system is configured to initiate execution of the streamed application after the streamed application has been installed on the host computer system, wherein during execution of the streamed application the management software is executable by the host computer system to intercept read requests to read one or more of the executable code blocks, and for each of the requested executable code blocks: a) determine whether the requested executable code block is stored on the first storage device of the host computer system; b) if the requested executable code block is stored on the first storage device, retrieve the requested executable code block from the first storage device; c) if the requested executable code block is not stored on the first storage device, retrieve the requested executable code block from the server computer system;

wherein the host computer system is configured to execute the one or more executable code blocks.

5. The system of claim 4, wherein the installation program is executable by the host computer system to copy the first subset of the plurality of information blocks from the installation medium to a cache on the first storage device; and wherein the management software is executable by the host computer system to retrieve one or more of the requested executable code blocks from the cache.

6. The system of claim 3, wherein the one or more read requests include a first read request requesting a first one or more information blocks, wherein the management software is executable by the host computer system to: a) determine that the first one or more information blocks are not included in the first subset of the plurality of information blocks stored on the installation medium; b) retrieve the first one or more information blocks from the server computer system; and c) cache the first one or more information blocks in a cache on the first storage device of the host computer system.

7. The system of claim 3, wherein the first subset of the plurality of information blocks includes one or more startup blocks needed to begin executing the streamed application.

8. The system of claim 3, wherein the streamed application includes a plurality of files;

wherein the installation program is further executable by the host computer system to store mapping information on the first storage device, wherein the mapping information maps each block of the first subset of the plurality of information blocks to a location within one of the plurality of files.

9. The system of claim 8, wherein the mapping information is stored on the installation medium;

wherein the installation program is further executable by the host computer system to store the mapping information on the first storage device by copying the mapping information from the installation medium to the first storage device.

10. The system of claim 8,
wherein the management software is further executable by the host computer system to map one or more requested information blocks to one or more pages of the plurality of files using the mapping information.

11. The system of claim 3,
wherein the host computer system is configured with an operating system that uses a particular page size for reading data from files;
wherein each information block of the first subset of the plurality of information blocks has a size equal to the particular page size.

12. A non-transitory installation medium storing:
a first subset of a plurality of information blocks of a streamed application, wherein a second subset of the plurality of information blocks of the streamed application is stored on a server computer system;
an installation program for installing the streamed application; and
management software for managing execution of the streamed application;
wherein the installation program is executable by a host computer system including a first storage device and one or more processors to: a) install the management software on the host computer system; and b) perform one or more read requests to request one or more information blocks of the streamed application to use in installing the streamed application on the host computer system;
wherein the management software is executable by the host computer system to intercept the one or more read requests, and for each of the requested information blocks: a) determine whether the requested information block is included in the first subset of the plurality of information blocks stored on the installation medium; b) if the requested information block is included in the first subset of the plurality of information blocks, retrieve the requested information block from the installation medium; c) if the requested information block is not included in the first subset of the plurality of information blocks, retrieve the requested information block from the server computer system; and d) return the requested information block to the installation program;
wherein the installation program is further executable by the host computer system to install the streamed application on the host computer system, wherein said installing the streamed application uses the information blocks returned by the management software, and wherein said installing the streamed application includes copying the first subset of the plurality of information blocks from the installation medium to the first storage device of the host computer system without transferring the first subset of the plurality of information blocks from the server computer system.

13. The non-transitory installation medium of claim 12,
wherein the plurality of information blocks of the streamed application includes a plurality of executable code blocks;
wherein the host computer system is configured to initiate execution of the streamed application after the streamed application has been installed on the host computer system, wherein during execution of the streamed application the management software is executable by the host computer system to intercept read requests to read one or more of the executable code blocks, and for each of the requested executable code blocks: a) determine whether the requested executable code block is stored on the first storage device of the host computer system; b) if the requested executable code block is stored on the first storage device, retrieve the requested executable code block from the first storage device; c) if the requested executable code block is not stored on the first storage device, retrieve the requested executable code block from the server computer system;
wherein the host computer system is configured to execute the one or more executable code blocks.

14. The non-transitory installation medium of claim 12,
wherein the streamed application includes a plurality of files;
wherein the installation program is further executable by the host computer system to store mapping information on the first storage device, wherein the mapping information maps each block of the first subset of the plurality of information blocks to a location within one of the plurality of files.

15. The non-transitory installation medium of claim 14,
wherein the management software is further executable by the host computer system to map one or more requested information blocks to one or more pages of the plurality of files using the mapping information.

16. The non-transitory installation medium of claim 12,
wherein the host computer system is configured with an operating system that uses a particular page size for reading data from files;
wherein each information block of the first subset of the plurality of information blocks has a size equal to the particular page size.

* * * * *